(12) United States Patent
Piirainen

(10) Patent No.: US 12,504,283 B2
(45) Date of Patent: Dec. 23, 2025

(54) MEMS GYROSCOPE SENSING IN-PLANE ROTATIONS

(71) Applicant: Murata Manufacturing Co., Ltd., Nagaokakyo (JP)

(72) Inventor: Tommi Piirainen, Vantaa (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 426 days.

(21) Appl. No.: 18/319,038

(22) Filed: May 17, 2023

(65) Prior Publication Data

US 2023/0408256 A1 Dec. 21, 2023

(30) Foreign Application Priority Data

May 17, 2022 (FI) ...................................... 20225432

(51) Int. Cl.
  *G01C 19/5712* (2012.01)
(52) U.S. Cl.
  CPC ................................ *G01C 19/5712* (2013.01)
(58) Field of Classification Search
  CPC ........................ G01C 19/5712; G01C 19/5762
  See application file for complete search history.

(56) References Cited

U.S. PATENT DOCUMENTS

| | | | | |
|---|---|---|---|---|
| 2005/0081633 A1* | 4/2005 | Nasiri | ................ | G01C 19/5712 73/514.29 |
| 2006/0156814 A1* | 7/2006 | Blomqvist | ......... | G01C 19/5712 73/504.12 |
| 2008/0115579 A1* | 5/2008 | Seeger | ................ | G01C 19/5712 73/504.12 |
| 2010/0186507 A1* | 7/2010 | Gunthner | ............. | G01C 19/574 257/E21.002 |
| 2011/0079080 A1* | 4/2011 | Meisel | ................ | G01C 19/5747 73/504.12 |
| 2011/0132087 A1 | 6/2011 | Ohms et al. | | |
| 2012/0055248 A1* | 3/2012 | Hammer | ............ | G01C 19/5712 73/504.12 |
| 2012/0125101 A1* | 5/2012 | Seeger | ................ | G01C 19/5733 73/504.14 |
| 2013/0068018 A1* | 3/2013 | Seeger | ................. | G01C 19/574 73/504.12 |
| 2013/0180332 A1* | 7/2013 | Jia | ....................... | G01C 19/5762 73/504.12 |
| 2013/0298672 A1 | 11/2013 | Kuhlmann et al. | | |

(Continued)

*Primary Examiner* — David J Bolduc
(74) *Attorney, Agent, or Firm* — ArentFox Schiff LLP

(57) ABSTRACT

A MEMS gyroscope for sensing rotational motion about an in-plane extending axis includes a body, a primary in-plane oscillator, a secondary in-plane oscillator and an out-of-plane oscillator. The primary in-plane oscillator includes an actuator element and is suspended from a primary anchor region on the body by a first spring system. The secondary in-plane oscillator is connected to the primary in-plane oscillator by a drive coupling spring system and is suspended from one or more secondary anchor points on the substrate by a second spring system. The out-of-plane oscillator is connected to the secondary in-plane oscillator by a third spring system. The drive coupling spring has higher rigidity in the first in-plane direction than in the out-of-plane direction, and the first spring system has higher rigidity in the first in-plane direction than the second spring system.

20 Claims, 5 Drawing Sheets

(56) References Cited

U.S. PATENT DOCUMENTS

| | | | |
|---|---|---|---|
| 2014/0026662 A1* | 1/2014 | Anac | G01C 19/56 73/504.12 |
| 2014/0260610 A1* | 9/2014 | McNeil | G01C 19/5712 73/504.12 |
| 2015/0068308 A1* | 3/2015 | Blomqvist | B81B 7/0058 73/504.12 |
| 2015/0211853 A1* | 7/2015 | Anac | G01C 19/5712 73/504.12 |
| 2015/0308828 A1* | 10/2015 | Jomori | G01C 19/5747 73/504.12 |
| 2015/0323323 A1* | 11/2015 | Blomqvist | G01C 19/5762 73/504.12 |
| 2016/0146605 A1* | 5/2016 | Furuhata | G01C 19/5712 73/504.12 |
| 2016/0334215 A1* | 11/2016 | Kato | G01C 19/5712 |
| 2017/0167876 A1* | 6/2017 | Coronato | G01C 19/5776 |
| 2018/0031602 A1* | 2/2018 | Huang | G01P 15/13 |
| 2018/0031603 A1* | 2/2018 | Huang | G01P 15/097 |
| 2018/0073875 A1* | 3/2018 | Anac | G01C 19/5762 |
| 2018/0120110 A1* | 5/2018 | Song | B81B 3/0051 |
| 2018/0180419 A1* | 6/2018 | Geisberger | G01C 19/5747 |
| 2018/0216935 A1* | 8/2018 | Senkal | G01C 19/5747 |
| 2018/0231381 A1 | 8/2018 | Lassl et al. | |
| 2018/0292211 A1* | 10/2018 | Besson | G01C 19/5769 |
| 2018/0340775 A1* | 11/2018 | Kuisma | G01C 19/5642 |
| 2020/0124418 A1* | 4/2020 | Blomqvist | G01P 15/02 |
| 2020/0200535 A1* | 6/2020 | Kuisma | G01C 19/5712 |
| 2020/0263987 A1* | 8/2020 | Blomqvist | G01C 19/574 |
| 2020/0263988 A1* | 8/2020 | Blomqvist | G01C 19/5747 |
| 2020/0263990 A1* | 8/2020 | Kuisma | G01C 19/5712 |
| 2021/0364291 A1* | 11/2021 | Blomqvist | G01C 19/574 |
| 2021/0372794 A1* | 12/2021 | Blomqvist | G01C 19/574 |
| 2022/0228864 A1* | 7/2022 | Reinmuth | G01C 19/5719 |
| 2022/0282972 A1* | 9/2022 | Geisberger | G01C 19/56 |
| 2023/0010336 A1* | 1/2023 | Zou | G01C 19/5656 |
| 2023/0085473 A1* | 3/2023 | Blomqvist | G01C 19/5733 73/504.12 |
| 2024/0288271 A1* | 8/2024 | Lapadatu | G01C 19/5712 |

* cited by examiner

MEMS GYROSCOPE SENSING IN-PLANE ROTATIONS

CROSS REFERENCE TO RELATED APPLICATIONS

This application claims priority to Finnish Patent Application No. 20225432, filed May 17, 2022, the contents of which are hereby incorporated by reference in its entirety.

TECHNICAL FIELD

The disclosure relates to MEMS gyroscopes, and particularly to MEMS gyroscopes that respond to angular motion with an out-of-plane directed oscillation.

BACKGROUND

An ideal MEMS (microelectromechanical system) gyroscope operates by driving a proof mass to oscillate along a first axis. The proof mass is free to oscillate along at least the first axis and a second axis, which is perpendicular to the first axis. Rotation of the MEMS gyroscope about a third axis, which is perpendicular to both the first and second axes causes the proof mass to experience a Coriolis force, which drives oscillation of the proof mass along the second axis. The amplitude of the proof mass's oscillation along the second axis is proportional to the rate of rotation about the third axis. Therefore, the rate of rotation about the third axis can be measured by measuring the amplitude of oscillation of the proof mass along the second axis.

In practice, imperfections in the MEMS structure, which inevitably arise when the MEMS gyroscope is being manufactured, lead to some degree of direct coupling of the drive oscillation, i.e., oscillation along the first axis, to the sense oscillation, i.e., oscillation along the second axis. The signal introduced by this direct coupling is called quadrature signal, as it is 90 degrees out of phase with the oscillation of the proof mass caused by the Coriolis force. The quadrature signal is a source of error in the measured amplitude of oscillation along the second axis and thus in the measured rate of rotation about the third axis.

Currently, existing techniques provide various methods how to compensate the quadrature signal electrically. However, it would be advantageous to deal with this error as far as possible already at its origin, by designing the structures for drive oscillation and sense oscillation so that the quadrature error is minimised.

In MEMS gyroscopes the proof mass is typically a planar object that extends essentially parallel to two in-plane directions, a first in-plane direction and a second in-plane direction that is perpendicular to the first in-plane direction. A third direction is an out-of-plane direction that is normal to a virtual plane that is parallel to the first in-plane direction and the second in-plane direction.

It is also well-known that MEMS etching techniques do not enable producing exactly vertical walls. Z-axis gyroscopes are a type of MEMS gyroscopes that sense angular motion about an axis that is parallel to the out-of-plane direction whereas the drive oscillation and sense oscillation are transitional modes that take place in the two mutually perpendicular in-plane directions. In z-axis gyroscopes, the effects from vertical inclinations in structures are manageable because planar surfaces of structures are very even, and etching techniques enable creation of narrow (of the order of micrometers) trenches that progress very linearly in the in-plane directions. The dimensions of directional springs in in-plane directions are thus quite exact and the effect of non-ideal vertical forms to detected signals is reasonable. The resulting quadrature error in z-axis gyroscopes can thus be quite effectively compensated electrically.

X- or y-axis gyroscopes sense angular motion about an axis that is parallel to one of the in-plane directions, the drive oscillation is translational motion along the other in-plane direction, and sense oscillation is translational motion parallel to the out-of-plane direction. Moving structures and springs that suspend the moving parts are etched from a same device layer and are thus essentially of the same thickness in the out-of-plane direction. The gyroscope includes typically a primary in-plane oscillator that includes a transducer that transforms an electrical signal into a linear oscillatory motion of the primary in-plane oscillator along a first in-plane axis. Resonance frequency and amplitude of this in-plane drive motion is defined by dimensions of a first spring system that couples the primary in-plane oscillator to a local stationary support, a substrate. Vertical inclination of springs of the first spring system extends through a whole layer thickness (of the order of tens of micrometers or more) of a device layer so the effect of the etching imperfections to the drive motion and thereby to the quadrature component is much greater than in the Z-axis gyroscopes.

SUMMARY OF THE INVENTION

According to an exemplary aspect, the present disclosure provides a MEMS gyroscope with structures configured to alleviate the above disadvantages in gyroscopes that sense rotational motion about an in-plane extending axis.

Thus, according to an exemplary aspect, a MEMS gyroscope is provided that includes a main body defining a substrate plane that is parallel to a first in-plane direction and to a second in-plane direction that is perpendicular to the first in-plane direction; a primary in-plane oscillator that includes an actuator element and that is suspended from a primary anchor region on the main body by a first spring system; a secondary in-plane oscillator that is connected to the primary in-plane oscillator by a drive coupling spring system and that is suspended from one or more secondary anchor points on the main body by a second spring system; an out-of-plane oscillator that is connected to the secondary in-plane oscillator by a third spring system; and drive circuitry configured to actuate oscillation of the primary in-plane oscillation with the actuator element.

Moreover, in an exemplary aspect, the drive coupling spring has a higher rigidity in the first in-plane direction than in an out-of-plane direction that is perpendicular to the substrate plane, and the first spring system has a higher rigidity in the first in-plane direction than the second spring system.

According to the exemplary aspects, technical advantages are provided based on the coupling of a primary in-plane oscillator to a substrate with a first spring structure and forming a drive coupling spring structure that couples in-plane motion of the primary in-plane oscillator to a secondary in-plane oscillator but de-couples the secondary in-plane oscillator from the out-of-plane motion of the primary in-plane oscillator. In order to enable such de-coupling in the out-of-plane direction without causing instability to the sense motion, the secondary in-plane oscillator is coupled to the substrate with a spring system that is elastic in the in-plane drive direction but rigid in other directions. The spring system that couples the secondary in-plane oscillator to the substrate is less rigid in the drive direction than the spring system that couples the drive structure to the substrate. An out-of-plane moving mass can then be suspended from the secondary in-plane oscillator so that it moves with it in the primary oscillation but does not experience effects of out-of-plane tilted springs of the first spring system.

BRIEF DESCRIPTION OF THE DRAWINGS

In the following the disclosure will be described in greater detail by means of exemplary preferred embodiments with reference to the accompanying drawings, in which.

DETAILED DESCRIPTION

In general, a gyroscope as described herein refers to an apparatus configured to measure rate of rotation of an object. Micromachined microelectromechanical systems (MEMS) gyroscopes are increasingly present in various industrial applications. A MEMS gyroscope is typically a vibrational structure that includes stationary parts and moving parts that that are elastically connected to the stationary parts. The stationary parts provide a frame of reference that can be fixed to move with a measured object. When the object and thus the stationary parts rotate, the moving parts are deflected by a Coriolis force that is relative to the rate of rotation. Selected moving parts and stationary parts can be connected to an electrical circuit so that the mechanical motion induced by the Coriolis force becomes transformed into one or more electrical signals that represent the current rate of rotation. In an exemplary aspect, a MEMS gyroscope can be implemented, for example, as a MEMS die.

Figure 1:
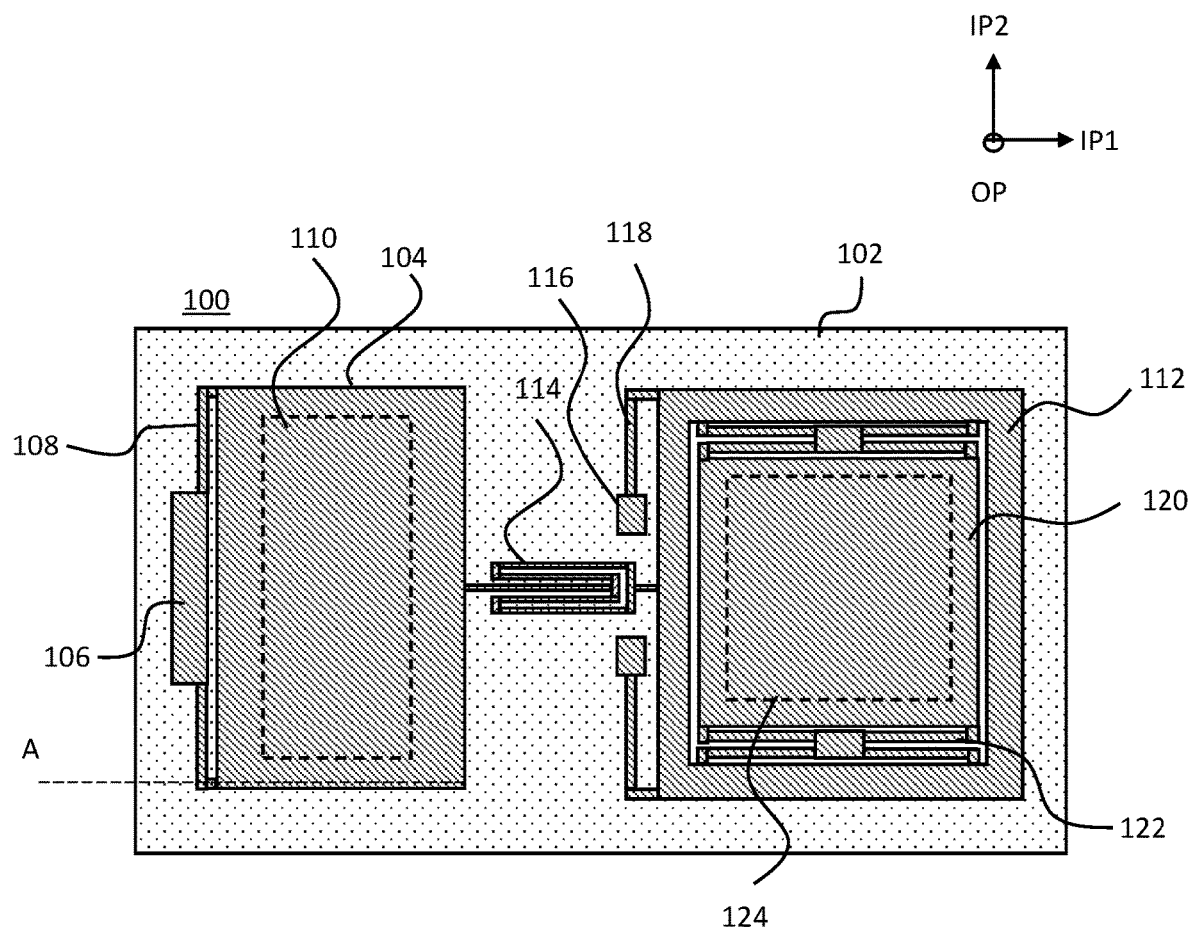
FIG. 1 illustrates basic parts of a MEMS gyroscope.

FIG. 1 is a schematic drawing that illustrates basic parts of a MEMS gyroscope discussed in the exemplary aspects provided herein. In general, the MEMS gyroscope 100 includes a substrate, and a body part 102 (e.g., a body or main body) that defines a virtual plane. The body part 102 refers here to a locally stationary part of the MEMS gyroscope. MEMS elements in general are manufactured from wafers that are patterned to include a plurality of MEMS elements, each of which includes structures for a specific electromechanical function. Wafers used in the processes are planar discs and in a MEMS element, the virtual plane can be considered as a plane that is parallel to a planar surface of the original wafer. A single MEMS element may thus include complex internal structures, but for a person skilled in the art, it is easy to identify the virtual plane as a plane parallel to the top/bottom surface of the original wafer disc. FIG. 1 shows with arrows two mutually orthogonal in-plane directions IP1, IP2 that are both parallel to the virtual plane, and an out-of-plane direction OP that is orthogonal to the two in-plane directions IP1 and IP2.

The MEMS gyroscope includes also a primary in-plane oscillator 104, a moving part that is elastically connected to the body part 102. The elastic connection is provided by a primary anchor region 106 and a first spring system 108. The first spring system 108 is a directional spring structure, which means that the form of the structure has been designed so that it extends between points of connection in the primary anchor region 106 and points of connection in the primary in-plane oscillator 104 and deforms between them easily in one or more selected directions but is very rigid in other directions. It is noted that a point of connection in this context does not refer to the mathematical dimensionless notion but to one or more limited regions through which two structural parts attach to each other. The primary anchor region 106 is a locally stationary structure that is rigidly fixed to the body part 102. The primary anchor region connects to points of connection of the first spring system 108 and fixes it thereby to the body part 102. Other points of connection of the first spring system 108 are connected to the primary in-plane oscillator 104. Accordingly, when the primary in-plane oscillator 104 moves, the first spring system 108 deforms between the primary anchor region 106 and the primary in-plane oscillator 104 according to its in-built directional form.

In addition, the primary in-plane oscillator 104 includes an actuator element 110 that is configured to actuate the primary in-plane oscillation to oscillate relative to the body part 102. The actuation element in this context refers to a transducer element that transforms electrical signals into mechanical motion. The oscillation of the primary in-plane oscillation is in-plane oscillation in a first in-plane direction IP1, and an advantageous method to actuate in-plane oscillation is electrostatic actuation. Electrostatic actuation induces oscillation by creating a reciprocal force between two electrodes, wherein one of the electrodes is fixed to the body part and one is fixed to the primary in-plane oscillator. The electrodes can be formed, for example, into comb-like form so that comb fingers of a stationary electrode fixed to the body part are interdigitated with comb fingers of a moveable electrode fixed to the primary in-plane oscillator. In operation, the in-plane oscillator can then be excited into vibration by applying an AC and DC voltage between the two electrodes. Mechanisms for electrostatic actuation are well known to a person skilled in the art of MEMS and need not be elaborated in more detail herein.

Figure 2:
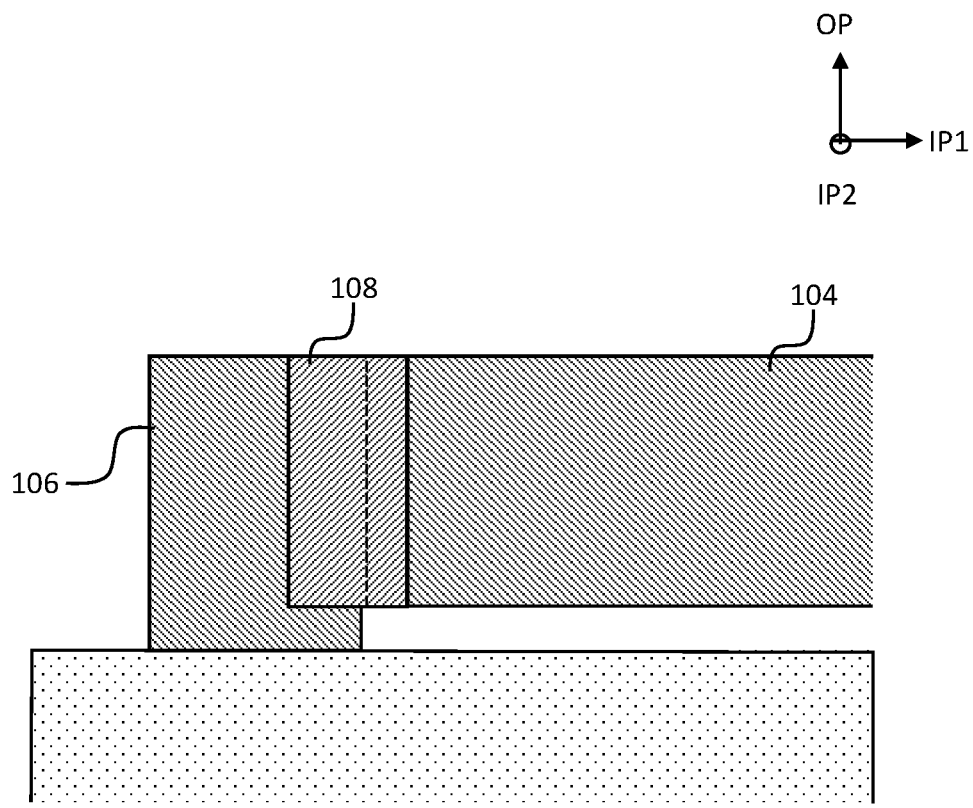
FIG. 2 shows an enlarged cut-away view of structures along line A of FIG. 1.

In the example of FIG. 1, the first spring system 108 includes two elongate bars, one end of each bar provides a point of connection to the primary anchor region 106 and the other end of each bar provides a point of connection to the primary in-plane oscillator 104. FIG. 2 shows an enlarged cut-away view of structures along line A of FIG. 1. The drawing illustrates that the bars are elongate elements so that the length dimension in the second in-plane direction IP2 and the height dimension in the out-of-plane direction OP of the bars are significantly larger that the width dimension of the bars in the first in-plane direction IP1. Due to this configuration, the bars bend elastically in response to forces in the first in-plane direction IP1, but do not essentially deflect in the second in-plane direction IP2 and in the out-of-plane direction OP. Accordingly, when the primary in-plane oscillator is actuated, the first spring system 108 is configured to direct the vibratory motion so that it occurs in the first in-plane direction IP1 in a resonance frequency that is dependent on the structural parameters of the first spring system.

Figures 3A, 3B:
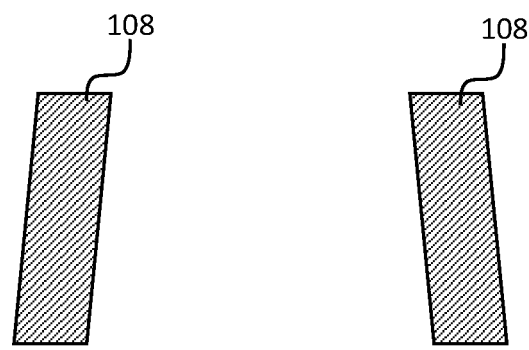
FIGS. 3a and 3b illustrate possible tilted profiles of the first spring system.

FIG. 2 illustrates an ideal case wherein all structural surfaces are absolutely rectilinear. However, MEMS structural parts are patterned into and released from a specific wafer layer, the device layer, and in practice, etching techniques do not enable such precision. Typically, the out-of-plane directed (e.g., vertical) walls in the patterns tend to be more or less tilted, the tilt angle varying depending on the position of the MEMS element in the wafer. FIGS. 3a and 3b illustrate possible tilted profiles of the bars in the first spring system 108. It is easily understood that even if the ideal bars in FIG. 2 very effectively resist motion of the primary in-plane oscillator 104 in the out-of-plane direction OP, motion of the primary in-plane oscillator enabled by the somewhat tilted structures of FIGS. 3a and 3b has a component also in the out-of-plane direction.

As further shown, the MEMS gyroscope includes also a secondary in-plane oscillator 112 that is connected to the primary in-plane oscillator 104. In most conventional structures, the secondary in-plane oscillator is rigidly coupled to the primary in-plane oscillator, but in this structure, the coupling is provided by a drive coupling spring system 114. The drive coupling spring system 114 is configured to couple the secondary in-plane oscillator 112 to the primary in-plane oscillator 104 so that the secondary in-plane oscillator is configured to move with actuated motions of the primary in-plane oscillator in the first in-plane direction IP1. Furthermore, the drive coupling spring 114 has higher rigidity in the first in-plane direction than in the out-of-plane direction. In other words, the drive coupling spring is rigid in the first in-plane direction and elastic in the out-of-plane direction. This elasticity of the drive coupling spring in the out-of-plane direction eliminates out-of-plane directed motions of the primary in-plane oscillator so that they are not transferred to the motions of the secondary in-plane oscillator 112. Accordingly, even if the oscillation of the primary in-plane oscillator 104 would not be precisely parallel to the first in-plane direction and thus includes an unknown out-of-plane directed component, the oscillation of the secondary in-plane oscillator is not correspondingly misaligned.

In order to eliminate potential instability by this out-of-plane elastic connection between the primary in-plane oscillator and the secondary in-plane oscillator, the secondary in-plane oscillator is suspended from one or more secondary anchor points 116 on the substrate by a second spring system 118 that is elastic in the first in-plane direction IP1 and rigid in other directions. In FIG. 1, the second spring system 118 includes two springs, each of which extends between an anchor point 116 and a point of connection to the secondary in-plane oscillator 112. In this configuration, each spring of this second spring system 118 deforms easily in the first in-plane direction IP1 but is rigid in other directions. However, as parameters for the vibration of the primary in-plane oscillator are based on characteristics of the first spring system 108, the first spring system and the second spring system are designed so that the first spring system 108 has higher rigidity in the first in-plane direction IP1 than the second spring system 118.

As further shown, the MEMS gyroscope includes also an out-of-plane oscillator 120, which is a structural part that is enabled to move with the actuated vibration and respond to the Coriolis force by motion in the out-of-plane direction OP and can thus be used to indicate the measured angular rate. Accordingly, the out-of-plane oscillator 120 is coupled to the primary in-plane oscillator 104 so that it moves along the actuated vibration in the first in-plane direction IP1 and is enabled to move in the out-of-plane direction OP in response to the Coriolis force induced by rotation of the body part 102 about an axis that is parallel to the second in-plane direction IP2. The coupling is implemented with a third spring system 122 that suspends the out-of-plane oscillator 120 from the secondary in-plane oscillator 112. In this configuration, the out-of-plane oscillator can be considered a floating part, meaning it is not anchored to the substrate. The third spring system 122 is a directional arrangement that is flexible in the out-of-plane direction and rigid in other directions.

The dashed line in FIG. 1 illustrates a part of the out-of-plane oscillator that is applied as a moving electrode 124 for capacitive sensing. This can be arranged by, for example, positioning a stationary electrode shaped like the dashed line on a layer (e.g., a cap of the MEMS gyroscope) opposite the out-of-plane oscillator 120. Angular motion of the gyroscope can then be determined by measuring change of capacitance between the moving electrode 124 and the stationary electrode. Other structural mechanisms may be applied within the scope. For example, the electrodes may include comb-structures wherein the overlap between comb fingers changes according to the Coriolis force induced motion of the out-of-plane oscillator.

When detection is based on out-of-plane moving element or elements, linear motion of the detected mass would be preferred since it avails improved signal levels and facilitates minimization of the mass structure. In the structure of FIG. 1, linearity of out-of-plane motion is improved by forming the third spring system 122 of at least two spring structures that connect the out-of-plane oscillator 120 to the secondary in-plane oscillator 112 points of connection in two opposite sides of the out-of-plane oscillator. In order to provide necessary support for the linear out-of-plane motion, the secondary in-plane oscillator 112 is advantageously a rigid frame type structure that includes a first bar that extends in the second in-plane direction IP2, and second and third bars that extend from opposite ends of the first bar in the first in-plane direction IP1. The first bar provides support for the drive coupling spring system 114, the second bar provides at least one point of connection for a first spring of the third spring system 122 on one side of the out-of-plane oscillator 120, and the third bar provides at least one point of connection for a second spring of the third spring system 122 on the opposite side of the out-of-plane oscillator 120. For added rigidity, the frame type structure may be a closed frame that surrounds out-of-plane oscillator 120, as shown in FIG. 2.

According to an exemplary aspect, to further improve linearity of the out-of-plane motion, the third spring system 122 can be formed so that each of the first and the second springs of the third spring system 122 has at least two points of connection to the out-of-plane oscillator 120 and these two points of connection are at opposite ends of the side of the out-of-plane oscillator 120 to which said spring is connected. Correspondingly, each of the first and the second springs of the third spring structure 122 has at least two points of connection to the secondary in-plane oscillator 112 and these two points of connection are at opposite ends of the side of the secondary in-plane oscillator 112 to which said spring is connected. When the first and second springs of the third spring system 122 are rigid in the first-in-plane direction and positioned to opposite sides of the out-of-plane oscillator 120, parasitic tilting modes of the out-of-plane oscillator 120 are effectively eliminated.

Figure 4A:
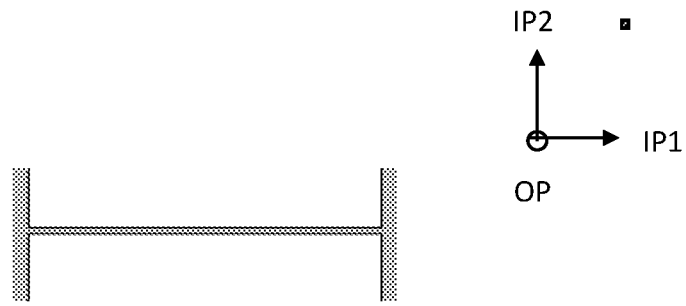
FIGS. 4a to 4c illustrate different types of spring structures applicable as drive coupling spring.
Figure 4B:
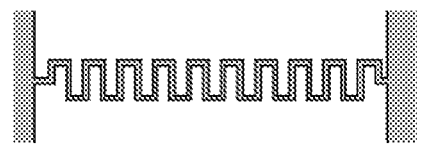
Figure 4C:
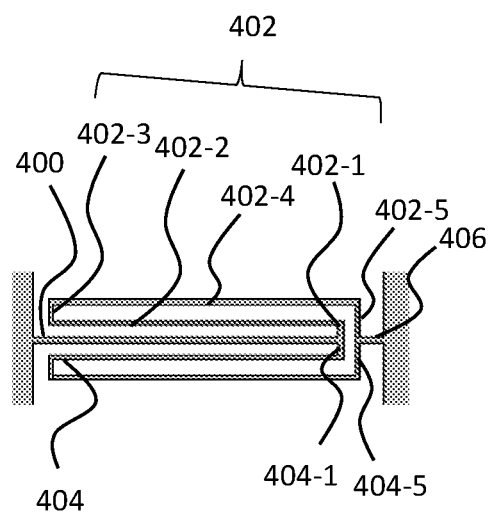

FIGS. 4a to 4c illustrate different types of spring structures applicable as drive coupling spring 114 of FIG. 1. FIG. 4a shows a drive coupling spring implemented as a beam spring. The beam spring is oriented such that the longitudinal axis of the beam spring is parallel to the first in-plane direction IP1. The spring structure of FIG. 4a provides a large spring constant and is thus very rigid in the first in-plane direction. This means that the amplitude of the primary in-plane oscillator and the amplitude of the secondary in-plane oscillator are practically identical. Appropriately decoupling spring constant in the out-of-plane direction can be achieved with typical device layer thicknesses applied in MEMS designs, FIG. 4b shows a drive coupling spring implemented as a serpentine folded beam spring, also known as a meandering spring. The meandering spring comprises a plurality of perpendicular spring subsections which extend in the second in-plane direction and are connected by parallel spring subsections that extend in the first in-plane direction. The spring structure of FIG. 4b can be designed to be more elastic in the out-of-plane direction that the beam spring of FIG. 4a without excessively compromising rigidity of the spring structure in the first in-plane direction.

FIG. 4c shows a folded beam spring structure that comprises a central beam section 400 that extends from the primary in-plane oscillator parallel to the first in-plane axis IP1. The central beam 400 branches into two branch sections 402, 404. A branch section 402 includes five branch subsections 402-1, 402-2, 402-3, 402-4, 402-5. A first branch subsection 402-1 extends away from the central beam section 400 in the second in-plane direction IP2. A second branch subsection 402-2 extends away from the first branch subsection 402-1 in the first in-plane direction IP1 and towards the primary in-plane oscillator. A third branch subsection 402-3 extends away from the second branch subsection 402-2 and away from the central beam section 400 in the second in-plane direction IP2. A fourth branch subsection 402-4 extends away from the third branch subsection 402-3 in the first in-plane direction IP1 and towards the secondary in-plane oscillator. A fifth branch subsection 402-5 extends away from the fourth branch subsection 402-4 towards the central beam 400 in the second in-plane direction IP2.

In this aspect, a branch section 404 includes similar branch sub-sections, but as a mirror image with respect to the central beam so that first branch subsections 402-1, 404-1 of the first and second branch sections 402, 404 extend away from the central beam section 400 in opposite directions. The fifth branch subsections 402-5, 404-5 of the first and second branch sections 402, 404 join together between the central beam section 400 and the secondary in-plane oscillator to form a joined section 406. The joined section extends coaxially with the longitudinal axis of the central beam section 400 and connects to the secondary in-plane oscillator.

The form of the spring structure of FIG. 4c minimises the spring constant of the second spring structure in the out-of-plane direction, but still enables maintaining appropriate rigidity in the first in-plane direction.

Figure 5A:
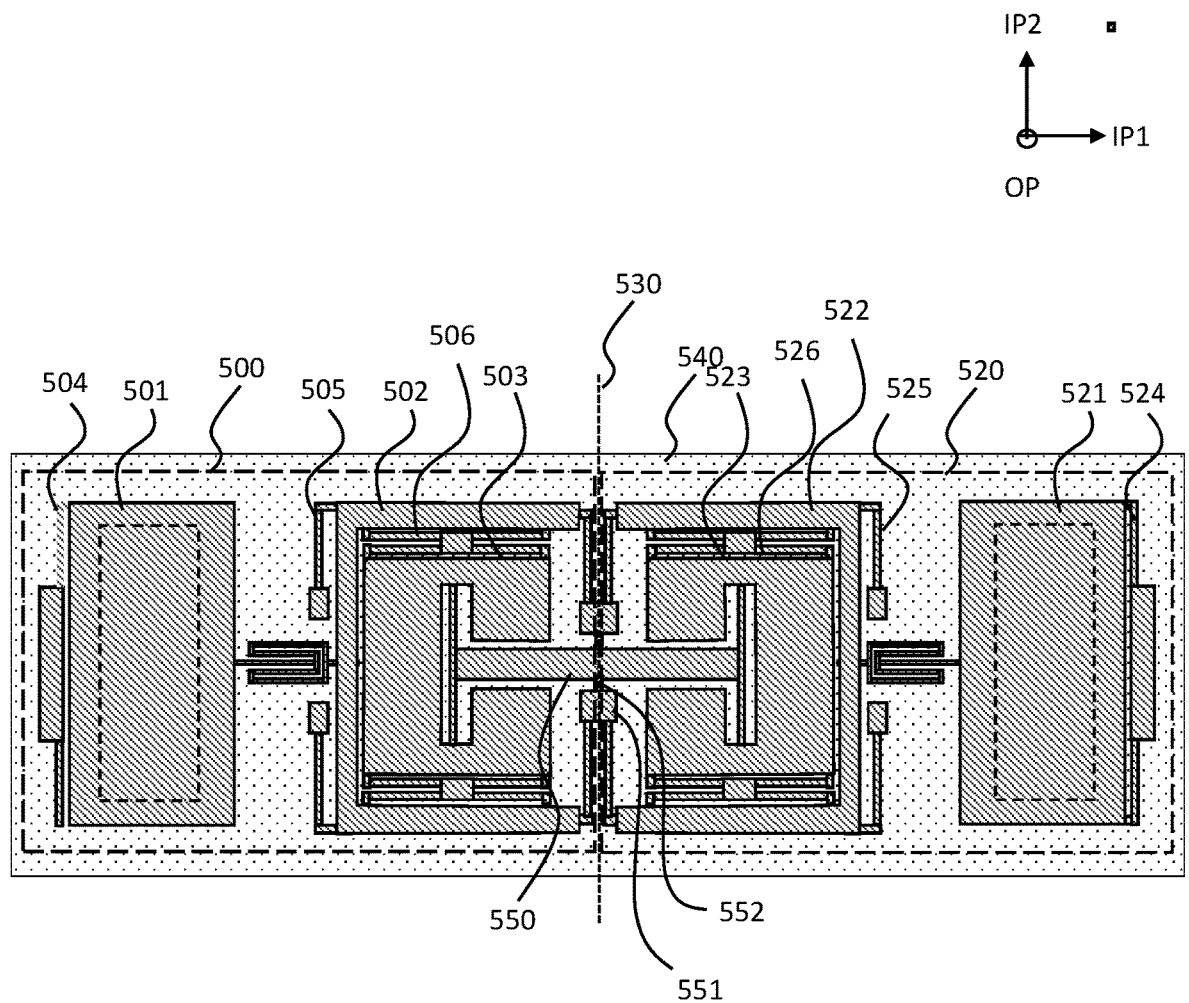
FIGS. 5a and 5b illustrate a further example for structure of a MEMS gyroscope.
Figure 5B:
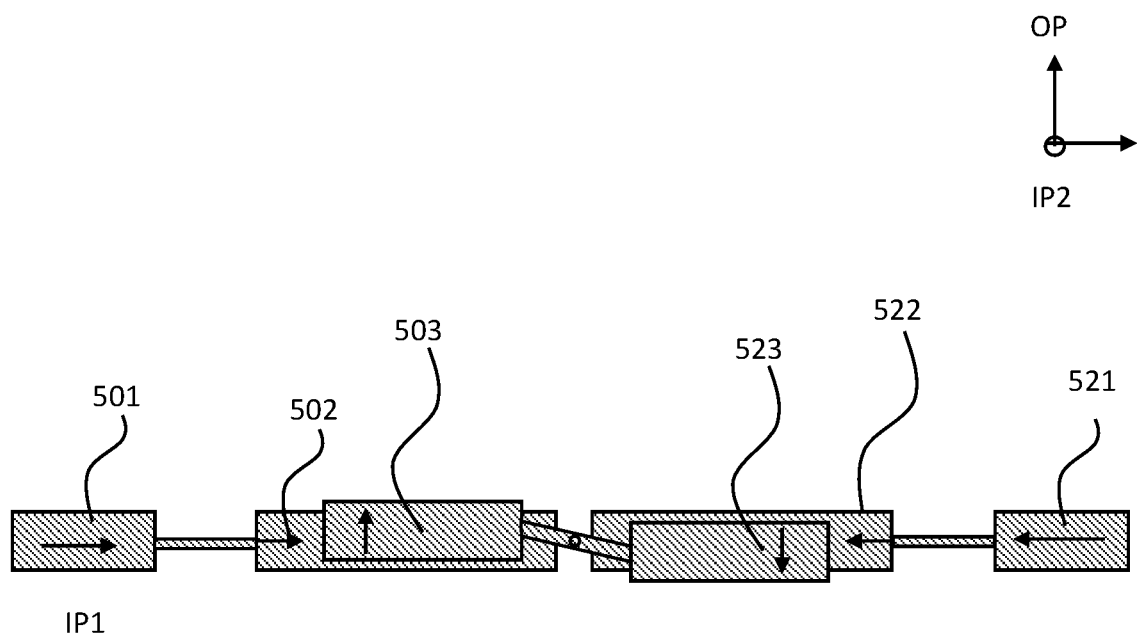

FIGS. 5a and 5b illustrate a further example for structure of a MEMS gyroscope in an exemplary aspect. In this example, the MEMS gyroscope includes two gyroscope parts 500, 520 that extend in-plane, in other words parallel to the virtual plane, and are mirror images of each other. The gyroscope parts 500, 520 can then be driven into primary oscillation in anti-phase so that in the presence of Coriolis force, the out-of-plane oscillators move to opposite directions in the out-of-plane direction OP. The out-of-plane oscillators are coupled to each other with a beam that is suspended to the body part so that it can rotate in a seesaw manner between the gyroscope parts. The configuration provides a balanced, symmetrical structure that enables differential detection and wherein possible out-of-plane directed misalignment from first spring systems is effectively eliminated.

FIG. 5a shows a top view of an example structure where a first gyroscope part 500 includes a first primary in-plane oscillator 501, a first secondary in-plane oscillator 502 and a first out-of-plane oscillator 503. A second gyroscope part 520 includes a second primary in-plane oscillator 521, a second secondary in-plane oscillator 522 and a second out-of-plane oscillator 523. Further description of the oscillator elements may be referred from description of FIG. 1.

As described above with respect to FIG. 1, the primary in-plane oscillators 501, 521 are suspended from the body part 540 with first spring systems 504, 524. Secondary in-plane oscillators 502, 522 are suspended from the body part 540 with second spring systems 505, 525. The out-of-plane oscillators 503, 523 are suspended from their respective secondary in-plane oscillators 502, 522 with third spring systems 506, 526. As the directional orientation of the first, second and third spring systems are as described with FIG. 1, the first and second gyroscope parts 500, 520 are suspended from the body part so that the primary oscillation is each gyroscope part occurs parallel to the first in-plane direction IP1. Furthermore, the first gyroscope part 500 and the second gyroscope part 520 are mirror symmetric with respect to an axis 530 that extends in the second in-plane direction IP2.

The first out-of-plane oscillator 503 and the second out-of-plane oscillator 523 are connected with a beam 550 that couples motions of the out-of-plane oscillators to each other. In an exemplary aspect, the beam 550 is suspended from the body part 540 through one or more anchors 551 and a fourth spring system 552 such that the beam 550 can rotate in a seesaw type motion about the axis 530. The first out-of-plane oscillator 503 and the second out-of-plane oscillator 523 respond to the same experienced angular motion but with opposite sensed motion. The sensed signals from these two out-of-plane oscillators can be processed differentially so that common error factors, like further accelerations or temperature related deformations of the structures, become by far cancelled out.

The drive circuitry (not shown) can now be configured to actuate oscillation of the first primary in-plane oscillator 501 and the second primary in-plane oscillator 521 in anti-phase. This means that when the first primary in-plane oscillator 501 moves to the positive first in-plane direction IP1+, the second primary in-plane oscillator 521 moves to the negative first in-plane direction −IP1, and vice versa. Accordingly, when the gyroscope is induced into angular motion about an axis in the second in-plane direction IP2, the Coriolis force causes the first out-of-plane oscillator 503 and the second out-of-plane oscillator 523 to move in opposite directions. This results into see-saw motion of the beam 550. The strong coupling by the see-saw beam 550 cancels out effects from possible manufacturing related errors and ensures that both out-of-plane oscillators oscillate with the same amplitude.

FIG. 5b shows simplified side view of the example structure of FIG. 5a in a situation where angular rate about an axis that is parallel to the second in-plane direction IP2 is detected. The primary in-plane oscillators 501, 521 and the secondary in-plane oscillators 502, 522 and the out-of-plane oscillators 503, 523 are in the driven primary motion in the first in-plane direction IP1 but move in anti-phase.

In general, it is noted that the exemplary embodiments described above are intended to facilitate the understanding of the present invention, and are not intended to limit the interpretation of the present invention. The present invention may be modified and/or improved without departing from the spirit and scope thereof, and equivalents thereof are also included in the present invention. That is, exemplary embodiments obtained by those skilled in the art applying design change as appropriate on the embodiments are also included in the scope of the present invention as long as the obtained embodiments have the features of the present invention. For example, each of the elements included in each of the embodiments, and arrangement, materials, conditions, shapes, sizes, and the like thereof are not limited to those exemplified above, and may be modified as appropriate. It is to be understood that the exemplary embodiments are merely illustrative, partial substitutions or combinations of the configurations described in the different embodiments are possible to be made, and configurations obtained by such substitutions or combinations are also included in the scope of the present invention as long as they have the features of the present invention.

What is claimed:

1. A MEMS gyroscope, comprising:
  a main body defining a substrate plane that is parallel to a first in-plane direction and to a second in-plane direction that is perpendicular to the first in-plane direction;
  a primary in-plane oscillator that includes an actuator element and that is suspended from a primary anchor region on the main body by a first spring system;
  a secondary in-plane oscillator that is connected to the primary in-plane oscillator by a drive coupling spring system and that is suspended from one or more secondary anchor points on the main body by a second spring system;
  an out-of-plane oscillator that is connected to the secondary in-plane oscillator by a third spring system; and
  drive circuitry configured to actuate oscillation of the primary in-plane oscillation with the actuator element;
  wherein the drive coupling spring has a higher rigidity in the first in-plane direction than in an out-of-plane direction that is perpendicular to the substrate plane, and
  wherein the first spring system has a higher rigidity in the first in-plane direction than the second spring system.

2. The MEMS gyroscope of claim 1, wherein the primary in-plane oscillator is configured to move relative to the main body in the first in-plane direction.

3. The MEMS gyroscope of claim 2, wherein the secondary in-plane oscillator is configured to move in the first in-plane direction.

4. The MEMS gyroscope of claim 3, wherein the out-of-plane oscillator is configured to move in the out-of-plane direction that is perpendicular to the substrate plane.

5. The MEMS gyroscope of claim 1, wherein the drive coupling spring is a beam spring oriented such that the longitudinal axis of the beam spring extends in a direction that is parallel to a first axis that extends in the first in-plane direction.

6. The MEMS gyroscope of claim 1, wherein the drive coupling spring is a folded beam spring comprising a central beam section that extends from the primary in-plane oscillator parallel to a first axis that extends in the first in-plane direction.

7. The MEMS gyroscope of claim 6, wherein the central beam branches into two branch sections that each comprise:
  a first branch subsection that extends away from the central beam section in the second in-plane direction;
  a second branch subsection that extends away from the first branch subsection in the first in-plane direction and towards the primary in-plane oscillator;
  a third branch subsection that extends away from the second branch subsection and the central beam section in the second in-plane direction;
  a fourth branch subsection that extends away from the third branch subsection in the first in-plane direction and towards the secondary in-plane oscillator; and
  a fifth branch subsection that extends away from the fourth branch subsection towards the central beam in the second in-plane direction.

8. The MEMS gyroscope of claim 7,
  wherein the two branch subsections extend away from the central beam section in opposite directions, and
  wherein the fifth branch subsections of each of the two branch sections join together between the central beam section and the secondary in-plane oscillator to form a joined section that extends coaxially with a longitudinal axis of the central beam section and that connects to the secondary in-plane oscillator.

9. The MEMS gyroscope of claim 1, wherein the drive coupling spring is a serpentine folded beam spring comprising a plurality of perpendicular spring subsections that extend perpendicular to a first axis that extends in the first in-plane direction and that are connected by parallel spring subsections extending parallel to the first axis.

10. The MEMS gyroscope of claim 1, wherein the second spring system has a higher rigidity in the out-of-plane direction than in the first in-plane direction.

11. The MEMS gyroscope of claim 1, wherein the secondary in-plane oscillator is a rigid frame type structure that includes at least a first bar that extends in the second in-plane direction, a second bar that extends from one end of the first bar in the first in-plane direction and a third part that extends from the other end of the first bar in the first in-plane direction.

12. The MEMS gyroscope of claim 11, wherein the secondary in-plane oscillator is a closed drive frame that surrounds the out-of-plane oscillator.

13. The MEMS gyroscope of claim 1, further comprising:
  a first gyroscope part that includes a first primary in-plane oscillator, a first secondary in-plane oscillator and a first out-of-plane oscillator; and
  a second gyroscope part that includes a second primary in-plane oscillator, a second secondary in-plane oscillator and a second out-of-plane oscillator.

14. The MEMS gyroscope of claim 13, wherein the first gyroscope part and the second gyroscope part are suspended on the main body along the first in-plane direction so that the first gyroscope part and the second gyroscope part are mirror symmetric with respect to an axis that extends in the second in-plane direction.

15. The MEMS gyroscope of claim 14, further comprising a beam that connects the first out-of-plane oscillator to the second out-of-plane oscillator and that is suspended from the main body with a fourth spring system, such that the beam is configured to rotate in a seesaw type motion about the axis.

16. The MEMS gyroscope of claim 15, wherein the drive circuitry is configured to actuate oscillation of the first primary in-plane oscillator and the second primary in-plane oscillator in anti-phase.

17. The MEMS gyroscope of claim 1, wherein the actuator element is a transducer element configured to transform electrical signals into mechanical motion.

18. The MEMS gyroscope of claim 1, wherein the out-of-plane oscillator is floating and not directly anchored to the main body.

19. A MEMS gyroscope
  a main body comprising a planar substrate defining a plane that is parallel to a first in-plane direction and to a second in-plane direction that is perpendicular to the first in-plane direction;

a primary in-plane oscillator suspended from a primary anchor region on the main body by a first spring system;
a secondary in-plane oscillator that is suspended from one or more secondary anchor regions on the main body by a second spring system;
a drive coupling spring system that connects the secondary in-plane oscillator to the primary in-plane oscillator, the drive coupling spring having a higher rigidity in the first in-plane direction than in an out-of-plane direction that is perpendicular to the substrate plane; and
an out-of-plane oscillator that is connected to the secondary in-plane oscillator by a third spring system,
wherein the first spring system has a higher rigidity in the first in-plane direction than the second spring system.

20. The MEMS gyroscope of claim 19, further comprising:
drive circuitry configured to actuate oscillation of the primary in-plane oscillation with the actuator element,
wherein the primary in-plane oscillator is configured to move relative to the main body in the first in-plane direction,
wherein the secondary in-plane oscillator is configured to move in the first in-plane direction, and
wherein the out-of-plane oscillator is configured to move in the out-of-plane direction that is perpendicular to the substrate plane.

* * * * *